(12) United States Patent
Keech et al.

(10) Patent No.: US 6,456,798 B1
(45) Date of Patent: Sep. 24, 2002

(54) BARCODE AND DATA STORAGE ARRANGEMENT ON A PHOTOGRAPHIC ELEMENT

(75) Inventors: John T. Keech, Penfield; Gary W. Ahlquist; John P. Spence, both of Webster, all of NY (US)

(73) Assignee: Eastman Kodak Company, Rochester, NY (US)

( * ) Notice: Subject to any disclaimer, the term of this patent is extended or adjusted under 35 U.S.C. 154(b) by 71 days.

(21) Appl. No.: 09/635,179

(22) Filed: Aug. 9, 2000

(51) Int. Cl.$^7$ ................................................ G03B 17/24
(52) U.S. Cl. ........................ 396/311; 396/315; 396/316; 396/317; 235/494
(58) Field of Search ........................ 235/462.25, 462.07, 235/462.12, 462.19, 494; 396/315, 311, 316, 317

(56) References Cited

U.S. PATENT DOCUMENTS

| | | |
|---|---|---|
| 3,718,074 A | 2/1973 | Davis |
| 4,211,558 A | 7/1980 | Oguchi et al. |
| 4,260,245 A | 4/1981 | Hujer |
| 4,286,146 A * | 8/1981 | Uno et al. .................. 235/456 |
| 4,365,882 A | 12/1982 | Disbrow |
| 4,464,045 A | 8/1984 | Findeis et al. |
| 4,577,961 A | 3/1986 | Terashita |
| 4,634,850 A | 1/1987 | Pierce et al. |
| 4,786,792 A | 11/1988 | Pierce et al. |
| 4,874,936 A | 10/1989 | Chandler et al. |
| 4,881,095 A | 11/1989 | Shidara |
| 4,884,102 A | 11/1989 | Terashita |
| 4,939,354 A | 7/1990 | Priddy et al. |
| 5,075,716 A | 12/1991 | Jehan et al. |
| 5,189,521 A | 2/1993 | Ohtsubo et al. |
| 5,198,907 A | 3/1993 | Walker et al. |
| 5,267,030 A | 11/1993 | Giorgianni et al. |
| 5,414,250 A * | 5/1995 | Swartz et al. ............ 235/462.1 |
| 5,452,055 A | 9/1995 | Smart |
| 5,519,510 A | 5/1996 | Edgar |
| 5,591,956 A | 1/1997 | Longacre, Jr. et al. |
| 5,612,524 A * | 3/1997 | Sant'Anselmo et al. .... 235/494 |
| 5,649,260 A | 7/1997 | Wheeler et al. |
| 5,667,944 A | 9/1997 | Reem et al. |
| 5,698,382 A | 12/1997 | Nakahanada et al. |
| 5,736,996 A | 4/1998 | Takada et al. |
| 5,758,223 A | 5/1998 | Kobayashi et al. |
| 5,767,983 A | 6/1998 | Terashita |
| 5,832,328 A | 11/1998 | Ueda |
| 5,900,617 A * | 5/1999 | Dvorkis et al. ........ 235/472.01 |
| 5,988,896 A | 11/1999 | Edgar |

FOREIGN PATENT DOCUMENTS

| | | |
|---|---|---|
| EP | 0762201 A1 | 3/1997 |
| EP | 0926550 A1 | 6/1999 |
| JP | Hei 11-316448 | 11/1999 |

* cited by examiner

Primary Examiner—David M. Gray
Assistant Examiner—Michelle Nguyen
(74) Attorney, Agent, or Firm—Thomas H. Close

(57) ABSTRACT

A method of placing a two-dimensional barcode symbol on a photographic element, the barcode symbol comprising collections of modules arranged in a regular array with a plurality of defined orientation directions, the photographic element exhibiting linear defects in a predominant direction and having a maximum width, includes the step of orienting the barcode symbol so that each defined orientation direction is rotated relative to the predominant direction sufficient so that no single collection of modules aligned in a defined orientation direction is completely obscured by the defect.

37 Claims, 4 Drawing Sheets

BARCODE AND DATA STORAGE ARRANGEMENT ON A PHOTOGRAPHIC ELEMENT

FIELD OF THE INVENTION

The present invention relates to photography and more particularly to the arrangement of barcodes and data encoded therein on photographic elements for use in photofinishing.

BACKGROUND OF THE INVENTION

Placing data regarding properties of a photographic element in association with the element is a practice well known in the art. This data can be stored in many ways, including two-dimensional barcode symbols optically printed on to the photographic element.

Optical storage and retrieval of data written in a rectangular grid aligned with the length of the medium for scanning by a linear CCD array has been disclosed in U.S. Pat. No. 4,786,792 issued Nov. 22, 1988 to Pierce et al. entitled Transmissively Read Quad Density Optical Data System, and U.S. Pat. No. 4,634,850 issued on Jan. 6, 1987 to Pierce et al. entitled Quad Density Optical Data System. Unfortunately, we have found that the requirement of alignment of the data grid with the medium leads to loss of data as a result of linear defects present in the photographic element. These defects include but are not limited to scratches, digs, processing draglines, coating streakiness, coating waviness, etc.

Use of two-dimensional barcode symbols to store data is well known in the prior art and many such symbologies have been standardized by national and international standards organizations. For example, the Data Matrix symbology, disclosed in U.S. Pat. No. 4,939,354 issued Jul. 3, 1990 to Priddy et al. entitled Dynamically Variable Machine Readable Binary Code and Method for Reading and Producing Thereof, is the subject of the standards ANSI/AIM BC-11-1997 and ISO/IEC 16022:2000. A second such example, the MaxiCode symbology, disclosed in U.S. Pat. No. 4,874,936 issued Oct. 17, 1989 to Chandler et al. entitled Hexagonal, Information Encoding Article, Process and System, is the subject of the standards ANSI/AIM BC-10-1997 and ISO/IEC 16023:2000. A third such example, the Aztec Code symbology, disclosed in U.S. Pat. No. 5,591,956 issued Jan. 7, 1997 to Longacre et al. entitled Two Dimensional Data Encoding Structure and Symbology for Use with Optical Readers, is the subject of the standard ANSI/AIM BC-13-1998. Such two-dimensional symbologies advantageously contain error detection and correction capability. Further, software used to locate, decode, and detect and correct errors in symbols in a digital image file is readily available. For example, software for locating and decoding the Data Matrix and MaxiCode symbology is available as the SwiftDecoder™ software product from Omniplanar Inc., Princeton, N.J. Finally, the required scanning and digitization equipment needed to obtain digital image files from a photographic element is readily available in the photofinishing industry.

Unfortunately, we have found that despite their built-in error detection and correction capabilities, the use of such two-dimensional barcode symbols remains prone to various inefficiencies, errors, and loss of data as a result of linear defects present in the photographic element.

We have also found that redundant encoding of critical data in multiple independent symbols or regions within symbols does not in itself provide adequate protection against such extended linear defects. Such defects can still affect the ability to efficiently and effectively decode multiple symbols or regions within symbols, particularly when arranging these symbols to efficiently utilize the limited area typically available on a photographic element such as a film strip.

Further, when multiple two-dimensional barcode symbols are used, decoding software must also recognize and separately decode information from each symbol. We have found such software is inefficient when symbols are directly juxtaposed, even in the absence of extended linear defects.

There is a need therefore for an improved barcode and data encoding arrangement that minimizes the problems noted above.

SUMMARY OF THE INVENTION

The need is met according to the present invention by providing a method of placing a two-dimensional barcode symbol on a photographic element, the barcode symbol comprising collections of modules arranged in a regular array with a plurality of defined orientation directions, the photographic element exhibiting linear defects in a predominant direction and having a maximum width, that includes the step of orienting the barcode symbol so that each defined orientation direction is rotated relative to the predominant direction sufficient so that no single collection of modules aligned in a defined orientation direction is completely obscured by the defect.

A two-dimensional symbol advantageously may be located and oriented arbitrarily relative to specific directions in the storage medium and the image acquisition system. In the present invention, such a symbol, comprising a regular array of modules, written on a photographic element exhibiting linear defects in a predominant direction, is oriented to enhance efficient and effective data recovery from a symbol corrupted by such a linear defect.

Data advantageously may be partitioned into several segments and encoded in several symbols that in turn may be independently placed on the storage medium. In the present invention, such a collection of symbols, written on a photographic element exhibiting linear defects in a predominant direction, is arranged in an array to enhance efficient and effective data recovery by reducing the number of symbols corrupted by a linear defect. Further, each symbol in such an array is independently oriented or offset relative to the predominant linear defect direction to further enhance efficient and effective data recovery.

Data advantageously may be replicated in several symbols that in turn may be independently placed in an array on the storage medium. In the present invention, symbols containing replicate data, written on a photographic element exhibiting linear defects in a predominant direction, are placed in array positions that are offset relative to the predominant direction so that at most one symbol containing a data item is likely to be corrupted by such a linear defect, thereby assuring data integrity.

Finally, multiple symbols may advantageously be placed with additional space between them. In the present invention, the spacing is selected to aid symbol decoding software in the task of separating the symbols, resulting in increased efficiency in retrieving data even in the absence of extended linear defects.

DETAILED DESCRIPTION OF THE INVENTION

We have found it useful to store data on, or in association with, a photographic element. A photographic element includes at least a base with a photosensitive layer that is sensitive to light to produce a developable latent image. The photosensitive layer may contain conventional silver halide chemistry, or other photosensitive materials such as thermal or pressure developable chemistries. It can have a transparent base, a reflective base, or a base with a magnetically sensitive coating. The photographic element can be processed through standard chemical processes, including but not limited to Kodak Processes C-41 and its variants, ECN-2, VNF-1, ECP-2 and its variants, D-96, D-97, E-4, E-6, K-14, R-3, and RA-2SM, or RA-4; Fuji Processes CN-16 and its variants, CR-6, CP-43FA, CP-47L, CP-48S, RP-305, RA-4RT; Agfa MSC 100/101/200 Film and Paper Processes, Agfacolor Processes 70, 71, 72 and 94, Agfachrome Processes 44NP and 63; and Konica Processes CNK-4, CPK-2-22, DP, and CRK-2, and Konica ECOJET HQA-N, HQA-F, and HQA-P Processes. The photographic element can be processed using alternate processes such as apparently dry processes that may retain some or all of the developed silver or silver halide in the element or that may include lamination and an appropriate amount of water added to swell the photographic element. Depending upon the design of the photographic element, the photographic element can also be processed using dry processes that may include thermal or high pressure treatment. The processing may also include a combination of apparently dry, dry, and traditional wet processes. Examples of suitable alternate and dry processes include the processes disclosed in: U.S. Serial No. 60/211,058 filed Jun. 3, 2000 by Levy et al.; No. 60/211,446 filed Jun. 3, 2000 by Irving et al.; No. 60/211,065 filed Jun. 3, 2000 by Irving et al.; No. 60/211,079 filed Jun. 3, 2000 by Irving et al.; EP Patent No. 0762201A1 published Mar. 12, 1997, by Ishikawa et al., entitled Method of Forming Images; EP Patent No. 0926550A1, published Dec. 12, 1998, by Iwai, et al., entitled Image Information Recording Method; U.S. Pat. No. 5,832,328 issued Nov. 3, 1998 to Ueda entitled Automatic Processing Machinefor a Silver Halide Photographic Light-sensitive Material; U.S. Pat. No. 5,758,223 issued May 26, 1998 to Kobayashi, et al. entitled Automatic Processing Machine for Silver Halide Photographic Light-sensitive Material; U.S. Pat. No. 5,698,382 issued Dec. 16, 1997 to Nakahanada, et al. entitled Processing Method for Silver Halide Photographic Light-sensitive Material; U.S. Pat. No. 5,519,510 issued May 21, 1996 to Edgar entitled Electronic Film Development; and U.S. Pat. No. 5,988,896 issued Nov. 23, 1999 to Edgar entitled Method and Apparatus for Electronic Film Development.

Figure 1:
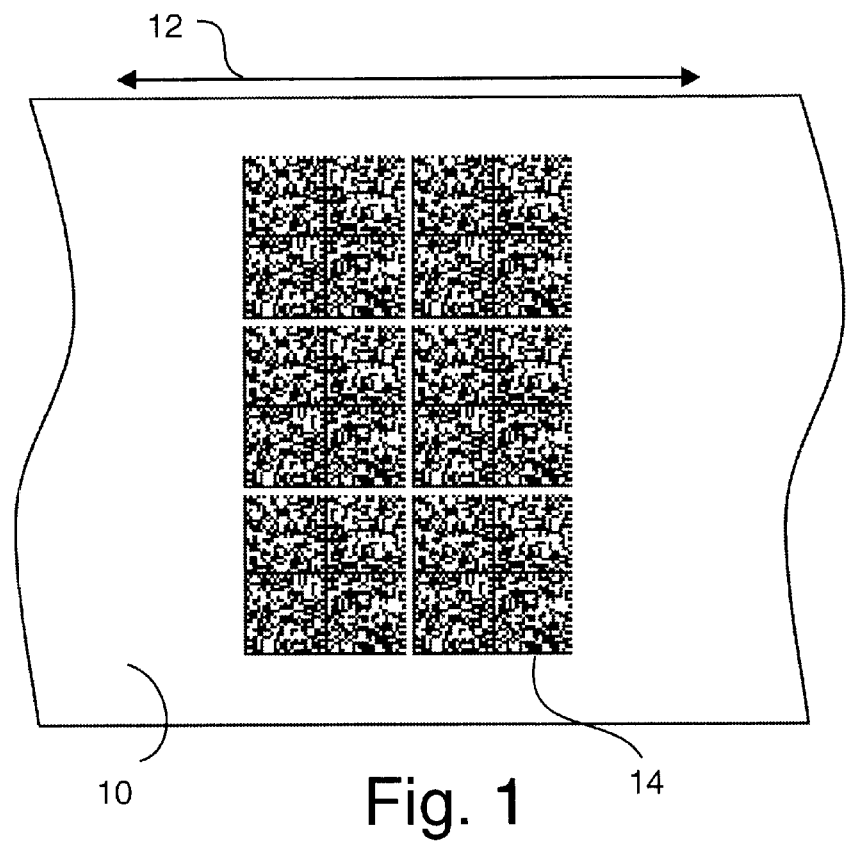
FIG. 1 is a schematic diagram of a film strip having a barcode symbol arrangement according to one aspect of the present invention.

According to the present invention, this data is stored in one or more two-dimensional barcode symbols optically printed on to the photographic element. Referring to FIG. 1, a photographic element 10 is shown with a longitudinal direction indicated by arrow 12. Exposed on the element is an array 14 of six two-dimensional barcode symbols. Symbol array 14 can be rapidly applied to a photographic element using an LCD mask and flash illumination as disclosed in copending U.S. Ser. No. 09/635,389, filed Aug. 9, 2000, entitled Apparatus For Exposing Sensitometric And Bar Code Data Onto Photosensitive Media and data stored therein may be readily retrieved using commercially available software to process images obtained from scanners that are readily available in the photofinishing trade. Preferred two-dimensional barcode symbologies include, but are not limited to Data Matrix (ANSI/AIM BC-11-1997, ISO/IEC 16022:2000), Code One (AIM USS-Code One), and Aztec Code (ANSI/AIM BC-12-1997, ITS/97/002).

Two-dimensional barcodes are designed to be versatile and robust means for storing machine-readable data. Various barcode symbologies comprise a collection of smaller features, called modules, which are the smallest unit of storage in the two-dimensional barcode symbol. Modules in turn can be of various sizes and shapes, depending upon the writing and detecting limitations invoked. Modules are organized in various regular arrangements to build a symbol, illustratively square, rectangular, or hexagonal. In such arrangements, there are directions in which multiple modules are closely aligned, defining two or more orientation directions.

Figure 2:
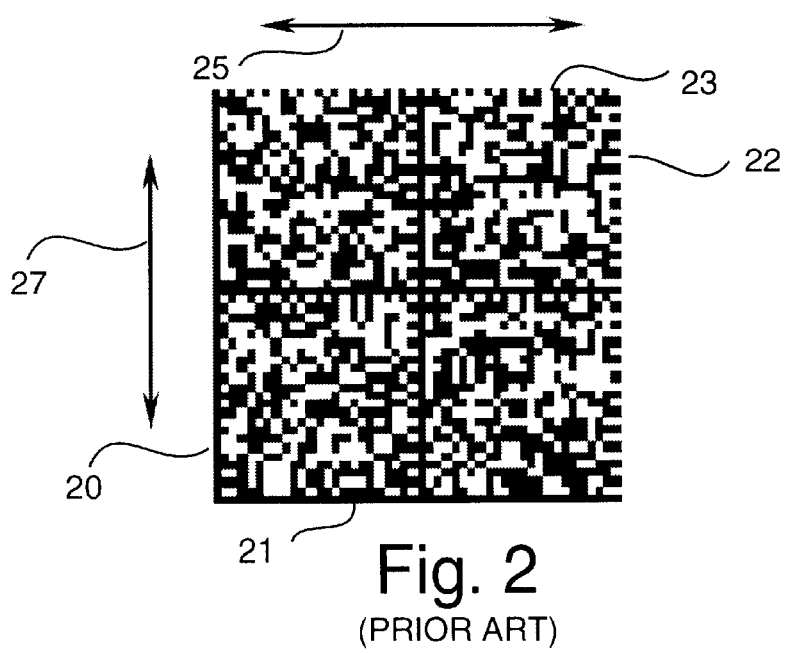
FIG. 2 is an enlarged view of a prior art two-dimensional barcode symbol useful in describing feature orientation within a symbol.

Referring to FIG. 2, which depicts a Data Matrix symbol comprising a collection of square modules organized as a square symbol, the edges 20 and 21 are formed with all dark modules, the edges 22 and 23 are formed with alternating dark and light modules. All modules within the symbol are aligned with these edges in the orientation directions 25 and 27. Barcode symbols can be comprised of various dimensional numbers of modules. For example, symbols comprising rectangular arrays of modules are 'x' by 'y' modules in size, where 'x' and 'y' can be many different numbers. Referring again to FIG. 2, both 'x' and 'y' are seen to be 48, as can be easily verified by counting the alternating modules on edges 22 and 23 respectively. The ability to choose various size and shape symbols provides great flexibility in using the two-dimensional symbologies to accommodate restrictions around space in the desired storage medium.

Many symbologies require only two discrete signal levels per module to properly encode data. When optically recorded on a photographic element, these two signal levels are ideally manifested as two discrete density levels upon subsequent development of the latent image. Since these levels are typically defined to be significantly different densities, the range of acceptable densities is usually very large for each signal level, providing robustness against noise sources such as grain or non-uniform illumination. Subsequent image processing steps of histogram analysis or binarization provide even greater robustness around density variation in the final symbol. Finally, these symbologies typically include some level of error detection and correction encoding. Encoding that is typically used in two-dimensional barcode symbologies, such as well-known Reed-Solomon codes, is designed to enable automated decoding processes, referred to as decoding software, to detect and correct occasional incorrect bits or clusters of bits. Such error correction encoding may be set to correct for an entire row of corrupted modules. Often data is randomized in the encoding process, so an entire row of modules is not a contiguous series of data items within the data encoded in the symbol.

Unfortunately, a common defect in photographic elements can create failures of varying degrees in data recovery. Photographic elements such as film strips exhibit linear defects in directions typically oriented along or across the strip arising from a plethora of effects. These effects include, but are not limited to, scratches, digs, processing draglines, coating streakiness, coating waviness, etc. These effects can be in either longitudinal or cross directions, but longitudinal defects are more common than cross defects.

The defects that arise during manufacturing can have widths of up to 100 microns. Film having larger defects is considered to be unsuitable for use and is generally detected and disposed of during manufacturing. The defects can be single cyan, magenta, or yellow in color, or any combination thereof, or neutral. The defects can be either lower or higher in density than the surrounding densities on the photographic element. The defects can occur during manufacturing of the photographic element, in a camera, in photofinishing equipment, or during subsequent storage of the developed photographic element. These defects are typically very closely aligned along or directly across the photographic element, within an angle of ½ of a degree or less from these actual directions. Typically, a photographic element would contain no more than one of these defects before it would be deemed unsuitable for use in printing, image processing, or image storage.

In photofinishing applications, the time required to correct a large group of incorrect bits, which can result from linear defects upon the photographic element, can be prohibitive. Further, if a sufficient number of modules are incorrectly classified, correction can even fail to produce correct data. Use of more robust codes to increase the likelihood of correcting errors, leads to a need for a larger symbol size or use of more symbols to encode a given amount of data, making inefficient use of the limited space available on a photographic element.

Additionally, there are certain collections of modules, typically organized along symbol orientation directions, which serve as locating features, or finder patterns, in two-dimensional barcode symbologies. These finder patterns enable automated decoding processes to locate and identify symbols in an image. Again referring to FIG. 2, the solid edges 20 and 21 together with the alternating edges 22 and 23 form a finder pattern for the illustrated Data Matrix symbol. The pair of solid edges 20 and 21 define a physical size and orientation of the symbol and the alternating edges 22 and 23 define dimensions of the symbol in terms of the number of modules in each corresponding direction. Similar features are used in other symbologies. Linear defects are especially problematic in decoding such two-dimensional barcode symbols when the defects are aligned parallel to an orientation direction of a symbol such as directions 25 and 27 shown in FIG. 2. In such a case, the density values of an entire row of modules such as an edge 20, 21, 22 or 23 that form a significant part of a finder pattern can be affected, degrading these locating features sufficiently to render them unusable. In this event, the automated decoding process does not locate or fails to properly identify the affected barcode symbol and thus any data stored in that symbol cannot be decoded and is unavailable.

Figure 3:
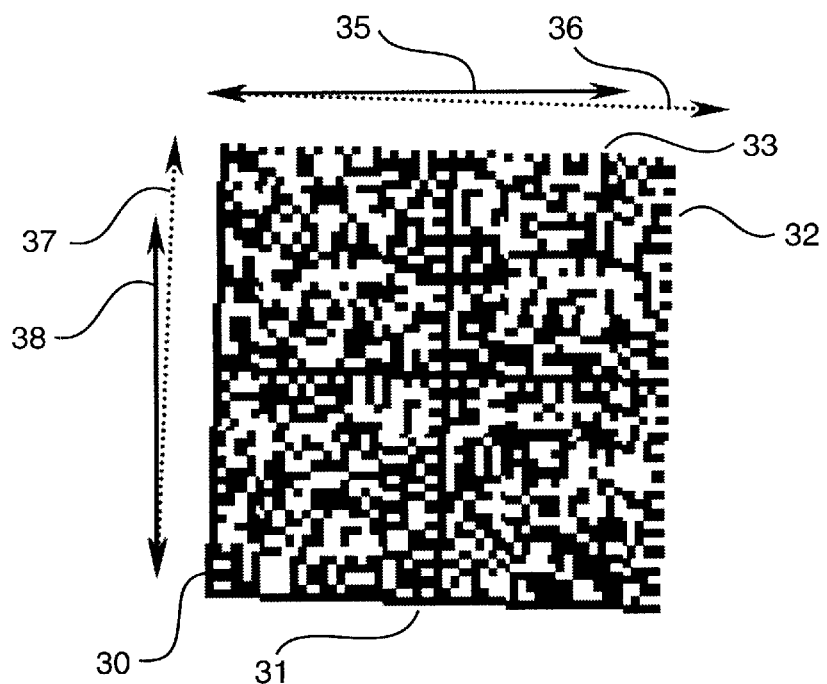
FIG. 3 is a diagram of a barcode symbol having defined orientation directions rotated with respect to a predominant direction according to one aspect of the present invention.

One solution to this problem according to the present invention is to distort the symbol so that the symbol orientation directions are sufficiently away from the predominant direction or directions of extended linear defects in the photographic element. In a typical two dimensional barcode application, perfect alignment of the barcode symbol and a reading device cannot be assured. Symbols may be affixed in random locations or orientations to surfaces that can be randomly aligned or moving relative to a viewing axis of a reading device. In such uncontrolled situations, relative orientation and movement of the symbol and reading device results in various distortions of the symbol in the acquired image, including rotation, skew, and perspective distortions. Such distortions manifest themselves as rotations of orientation directions. Commercially available decoding software is capable of handling these distortions. By purposely distorting the symbol in the writing step, one can prevent the aforementioned defects from affecting an entire row of modules, especially finder patterns, within that symbol. Referring to FIG. 3, which depicts a rotated Data Matrix symbol, the orientation directions 36 and 37 are rotated relative to directions 35 and 38 aligned with longitudinal and cross dimensions of the photographic element respectively. The edges 30, 31, 32 and 33 are no longer aligned with linear defects which occur in the longitudinal and cross dimensions of the photographic element. In the pure rotation distortion of a rectangular symbol illustrated, the rotations of the two orientation directions happen to be equal. The principle of rotation of an orientation direction relative to a defect direction applies to other symbol geometries and distortions. For example, in a skew distortion, the rotations are unequal. In a perspective distortion, the rotations vary within the symbol.

Given a linear defect with a width of less than 100 microns, and a symbol having 48 75-micron modules, a modest rotation of 1 degree of a symbol orientation direction 36 or 37 relative to the longitudinal or cross dimensions of the photographic element 35 or 38 respectively has been found to improve the ability of the decoding process to identify and decode symbols in the presence of the defects mentioned above. However the software takes significant time to correct for the effects of the defect. A rotation of 2 degrees or more has been found to significantly improve the ability of the decoding process to identify and decode symbols in the presence of the defects in a more timely fashion.

Figure 4:
FIG. 4 is a diagram useful in describing the problem of symbol alignment with an extended linear defect.

Rather than placing all data in a single symbol, data advantageously may be partitioned into several segments and encoded in several symbols that in turn may be independently placed on the storage medium. Consider the effect that a single extended linear defect could have upon two or more two-dimensional barcode symbols with an orientation direction aligned with the defect. Referring to FIG. 4, two symbols 40, and 402 are aligned such that a linear defect, illustratively 44 or 46, intercepts common features on both symbols. The symbols illustrated in FIG. 4 are Data Matrix symbols having a one module wide quiet zone between the symbols, thereby enabling the decoding software to distinguish the symbols. Defect 44 comprises a linear zone in which densities are abnormally low, referred to as a minus density defect. Such a defect causes the density of co-aligned modules to be read as low, regardless of their intended density. Defect 46 comprises a linear zone in which densities are abnormally high, referred to as a plus density defect. Such a defect would cause the density of co-aligned modules to be read as high, regardless of their intended density. Either type of defect could damage an entire row of modules in each symbol, affecting either a contiguous string of data or, worse, locating features in each symbol. FIG. 4 depicts a minus density defect 44 co-aligned with an all high edge in both symbols. FIG. 4 also depicts a plus density defect 46 co-aligned with an alternating edge in both symbols. The coincidence of either type of defect with either of these critical features in multiple co-aligned symbols could sufficiently affect any or all of the symbols such that one or more would no longer be locatable or decodable by the automated process. Thus according to one aspect of the present invention, alignment of the critical features such as finder patterns in several symbols along a direction in which linear defects occur is to be avoided.

Figure 5:
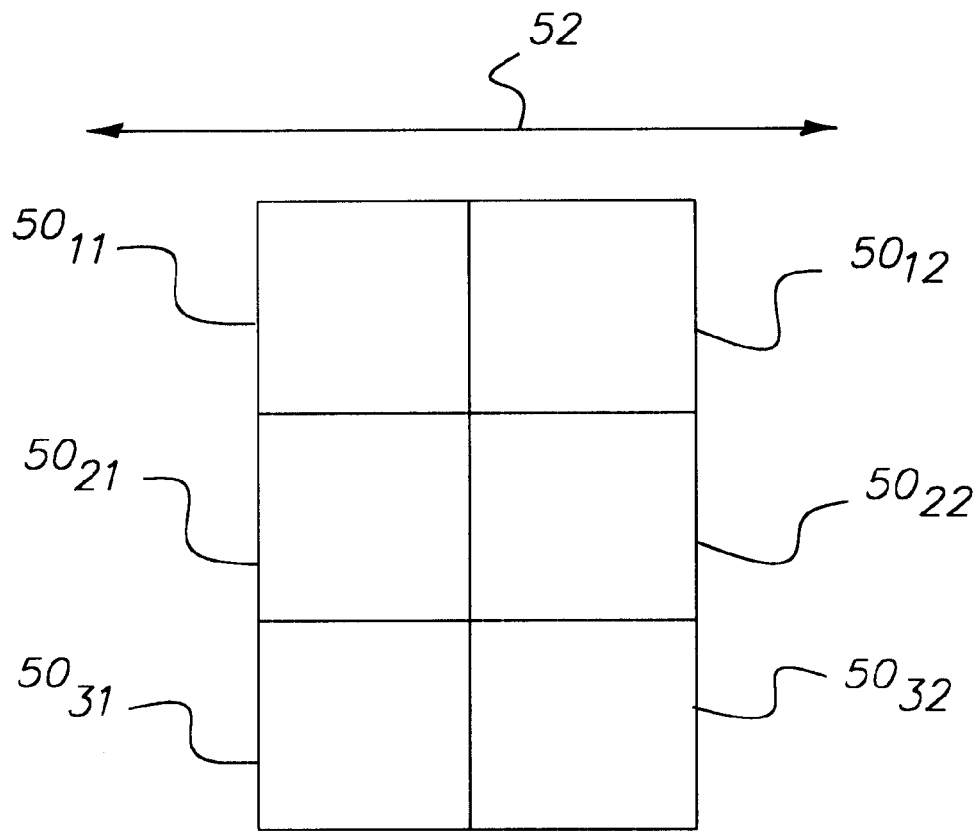
FIG. 5 is a schematic diagram of an array of symbol location placed according to one aspect of the present invention.

A partial solution to this problem according to the present invention is to arrange the symbols in a pattern designed to decrease the number of symbols that one defect could affect. Specifically, consider partitioning a rectangular area on a photographic element into an array of symbols arranged in an 'm' by 'n' rectangular pattern, where 'm' is the number of rows of symbols aligned along the vertical direction, typically across the width of the photographic element, and 'n' is the number of columns of symbols along a horizontal direction, typically along the length of the photographic element. Referring to FIG. 5, an illustrative arrangement of six symbols is shown in a three by two rectangular pattern. Symbols $50_{11}$, $50_{21}$, and $50_{31}$, form one column and symbols $50_{12}$, $50_{22}$, and $50_{32}$ form a second column. Alternatively, symbols $50_{11}$ and $50_{12}$ form one row, symbols $50_{21}$ and $50_{22}$ form a second row, and symbols $50_{31}$ and $50_{32}$ form a third row. The number of columns, 'n', is kept equal to or lower than the number of rows, 'm', in the usual case when there is a higher frequency of horizontal defects, aligned with the direction 52, compared to vertical defects, perpendicular to direction 52. Having defined the locations for the symbols, one then places symbols at the locations, thereby reducing the number of symbols that could be affected by a single defect in either direction when compared to a linear arrangement.

It would be preferred not to have a single row of symbols for the reasons described above. Thus, one aspect of this invention is arranging collections of symbols in greater than one row, such that 'm' is greater than 1. Similarly, it would be preferred not to have a single column of symbols, for the reasons described above. Thus, another aspect of this invention is arranging collections of symbols in greater than one column, such that 'n' is greater than 1. The number of rows of symbols is greater than 1 to insure that a single vertical defect does not adversely affect all of the symbols. The number of columns of symbols is greater than 1 to insure that a single horizontal defect does not adversely affect all of the symbols.

Figure 6:
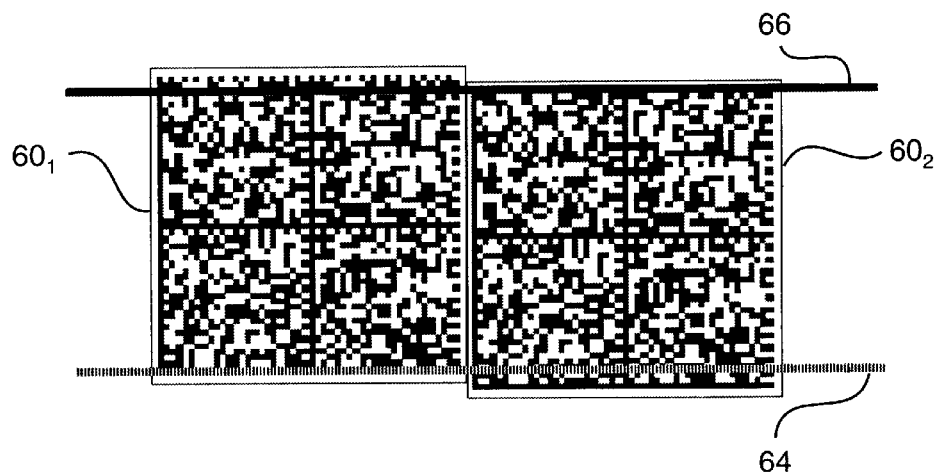
FIG. 6 is a schematic diagram of an arrangement of two-dimensional barcode symbols offset according to one aspect of the present invention.

Another technique according to an aspect of the present invention to decrease the number of symbols that one defect could render unlocatable or undecodable is to offset the symbols relative to each other so that the locating features within the collection of symbols will not be co-aligned with a single linear defect. Referring to FIG. 6, a pair of aligned symbols $60_1$ and $60_2$ are shown placed in an offset fashion. Now linear defects aligned with the symbols, illustratively a minus density defect 64 or a plus density defect 66, affect different portions of the symbols $60_1$ and $60_2$. Even though the minus density defect 64 intercepts both symbols, the defect affects the entire horizontal portion of a finder pattern on the edge of symbol $60_1$, likely to render it unlocatable or undecodable, but only a small vertical portion of a finder pattern in symbol $60_2$, allowing it to be located and decoded. Similarly the plus density defect 66 would likely render symbol $60_2$ unlocatable or undecodable yet allow symbol $60_1$ locatable and decodable.

This offset aspect of the invention minimizes the number of symbols that a single defect could render unlocatable or undecodable. Offsetting symbols within a horizontally aligned row of symbols by a vertical distance improves the likelihood that a single horizontal defect will render at most one symbol unlocatable or undecodable. This offset distance needs to be equal to or greater than the size of a module to provide this feature. Preferably, this distance needs to be two or more times greater than the size of a module to provide this feature.

Similarly, offsetting symbols within any vertically aligned column of symbols by a horizontal distance will improve the likelihood that a single vertical defect will render at most one symbol unlocatable or undecodable. This offset distance again needs to be equal to or greater than the size of a module to provide this feature. Preferably, this distance needs to be two or more times greater than the size of a module to provide this feature.

Even if there is a single row of symbols ('m'=1) or a single column of symbols ('n'=1), this offset aspect of the invention alone provides improved robustness around locatability and decodability of the collection of symbols in the presence of a horizontal or vertical defect. This offset aspect of the invention may advantageously be combined with the 'm' by 'n' arrangement of symbols invention, with all of the 'n' symbols in a row of symbols placed within the symbols offset relative to each other, or all of the 'm' symbols in a column of symbols placed within the symbols offset relative to each other. In this way, a single defect may affect all symbols in that row, but not at the same vicinity within each symbol.

Figure 7:
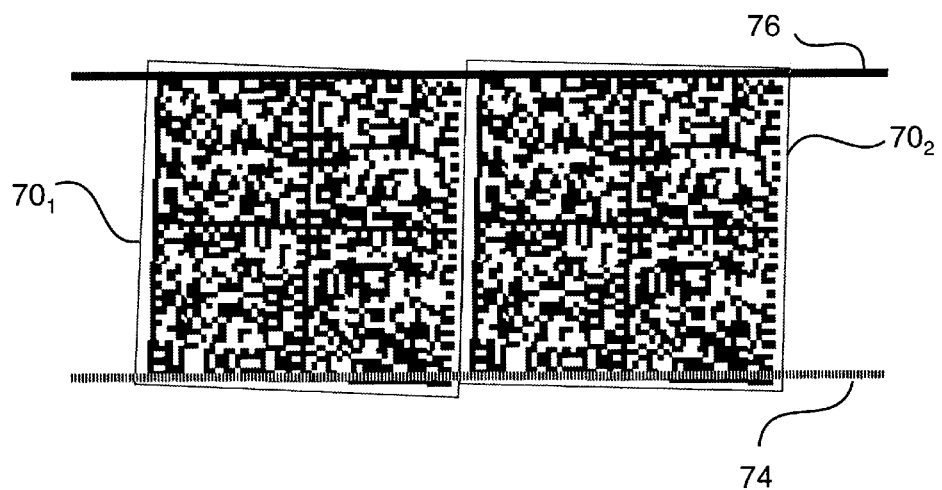
FIG. 7 is a schematic diagram of an arrangement of two-dimensional barcode symbols oriented according to one aspect of the present invention.

The distortion aspect of the present invention may also be combined with the 'm' by 'n' arrangement of symbols aspect of the invention, with the orientation directions of a symbol rotated relative to a defect direction. In this way, each symbol is afforded the protection against problems associated with co-alignment of contiguous modules in a symbol and defect directions. Referring to FIG. 7, a pair of rotated symbols $70_1$ and $70_2$ are shown. Each symbol is shown intercepted by a minus density linear defect, such as 74, or a plus density linear defect, such as 76. Due to the small angle formed between the nearly horizontal orientation direction of the symbols and the horizontal orientation of the defects, no entire row of modules in a finder pattern component is obscured, enhancing the likelihood that the symbols would be properly located and decoded.

Although the above aspects of the invention provide robustness in the presence of extended linear defects, they do not altogether eliminate the possibility of loss of data from an individual symbol or inability to provide access to data in a timely fashion. Another aspect of the invention provides maximal assurance of timely recovery of all critical data. This is achieved by replicating critical data in two or more symbols, with the symbols arranged in a manner to minimize the probability that a single defect will cause all of the critical data to be affected. Specifically, symbols in which copies of a critical data item are placed are assigned to locations that are in different rows or columns or both within the array of symbols. Again referring to FIG. 5, one could illustratively place two symbols containing replicated data into symbol locations $50_{11}$ and $50_{22}$ or $50_{11}$ and $50_{32}$. Such placement ensures that a single defect aligned with the rows or columns will not affect both symbols in which the data is replicated. Placement of symbols containing replicated data according to this aspect of the invention will ensure that all of the data is available when the unaffected symbols are decoded.

Finally, rapid and robust locatability and decodability of all symbols is highly desirable. Although the means by which symbols are located and separated from a potentially complex scene varies amongst the symbologies, we have found that a uniform region around each symbol one module in size and of substantially uniform density greatly enhances the speed and reliability of automated processes used to locate and decode the symbols. This creates a zone of two or more elements of uniform density between adjacent symbols. We believe that this performance enhancing feature is due to the nature of the algorithms used in the automated processes to locate and decode two-dimensional barcode symbols.

The invention has been described in detail with particular reference to certain preferred embodiments thereof, but it will be understood that variations and modifications can be effected within the spirit and scope of the invention.

PARTS LIST 10 photographic element
12 directional arrow
14 symbol array
20 edge
21 edge
22 edge
23 edge
25 orientation direction
27 orientation direction
30 edge
31 edge
32 edge
33 edge
35 direction
36 direction
37 direction
38 direction
40 symbol
44 linear defect
46 linear defect
50 symbol
52 direction
60 symbol
64 defect
66 defect
70 symbol
74 defect
76 defect

What is claimed is:

1. A method of placing a two-dimensional barcode symbol on a photographic element, the barcode symbol comprising collections of modules arranged in a regular array with a plurality of defined orientation directions, the photographic element exhibiting linear defects in a predominant direction and having a maximum width, comprising the step of:
   a) orienting the barcode symbol so that each defined orientation direction is rotated relative to the predominant direction sufficient so that no single collection of modules aligned in a defined orientation direction is completely obscured by the defect.

2. The method claimed in claim 1, wherein the rotation is effected by distorting the barcode symbol on the photographic element by skew or perspective distortion.

3. A method of placing a plurality of two-dimensional barcode symbols on a photographic element, the barcode symbols comprising collections of modules arranged in a regular array with a plurality of defined orientation directions, the photographic element exhibiting linear defects in a predominant direction and having a maximum width, comprising the step of:
   a) arranging the barcode symbols in an array such that the number of symbols in the array in a direction parallel to the predominant direction is less than or equal to the number of symbols in a direction perpendicular to the predominant direction.

4. The method claimed in claim 3, further comprising the step of:
   b) orienting the barcode symbols so that each defined orientation direction is rotated relative to the predominant direction sufficient so that no single collection of modules aligned in a defined orientation direction is completely obscured by a single defect.

5. The method claimed in claim 4 wherein the rotation is effected by distorting the barcode symbols on the photographic element by skew or perspective distortion.

6. The method claimed in claim 3, wherein the symbols have a critical feature used for locating, timing and/or symbol orientation and further comprising the step of
   b) offsetting the barcode symbols so that the critical features are offset by at least one module relative to each other in a direction perpendicular to the predominant direction.

7. The method claimed in claim 6, wherein the symbols are offset by two or more modules.

8. The method claimed in claim 3, further comprising the step of
   b) placing the barcode symbols so that a uniform region at least one module wide lies between each pair of symbols.

9. The method claimed in claim 3, wherein a symbol includes a critical data, and wherein the critical data is duplicated in two symbols.

10. The method claimed in claim 9, wherein the two symbols are offset in a direction perpendicular to the predominant direction so that a single defect cannot intercept both of the two symbols.

11. The method claimed in claim 10, wherein the two symbols are also offset in the predominant direction, so that a defect perpendicular to the predominant direction cannot intercept both of the two symbols.

12. A photographic element, the photographic element exhibiting linear defects in a predominant direction and having a maximum width, comprising:
   a) a base;
   b) a photosensitive layer on the base; and
   c) a latent image of a two-dimensional barcode symbol, the barcode symbol comprising collections of modules arranged in a regular array with a plurality of defined orientation directions, the latent image of the barcode symbol being arranged on the photographic element so that each defined orientation direction is rotated relative to the predominant direction sufficient so that no single collection of modules aligned in a defined orientation direction is completely obscured by the defect.

13. The photographic element claimed in claim 12, wherein the rotation of the defined orientation directions of the barcode symbol is achieved by distorting the bar code symbols by skew or perspective distortion.

14. The photographic element claimed in claim 12, wherein a plurality of two-dimensional barcode symbols are contained in the latent image the symbols being arranged in an array such that the number of symbols in the array in a direction parallel to the predominant direction is less than or equal to the number of symbols in a direction perpendicular to the predominant direction.

15. The photographic element claimed in claim 14, wherein the symbols have a critical feature used for locating, timing and/or symbol orientation and are offset so that the critical features are offset by at least one module relative to each other in a direction perpendicular to the predominant direction.

16. The photographic element claimed in claim 14, wherein said barcode symbols are arranged so that a uniform region at least one module wide lies between each pair of symbols.

17. The photographic element claimed in claim 14, wherein a symbol includes a critical data, and wherein the critical data is duplicated in two symbols.

18. The photographic element claimed in claim 17, wherein the two symbols are offset in a direction perpendicular to the predominant direction so that a single defect cannot intercept both of the two symbols.

19. The photographic element claimed in claim 18, wherein the two symbols are also offset in the predominant direction, so that a defect perpendicular to the predominant direction cannot intercept both of the two symbols.

20. The photographic element claimed in claim 12, wherein the photographic element is a film strip.

21. The photographic element claimed in claim 12, wherein the photosensitive layer contains conventional silver halide chemistry.

22. The photographic element claimed in claim 12, wherein the photosensitive layer contains thermal developable chemistry.

23. The photographic element claimed in claim 12, wherein the photosensitive layer contains pressure developable chemistry.

24. The photographic element claimed in claim 14, wherein the photographic element is a film strip.

25. The photographic element claimed in claim 14, wherein the photosensitive layer contains conventional silver halide chemistry.

26. The photographic element claimed in claim 14, wherein the photosensitive layer contains thermal developable chemistry.

27. The photographic element claimed in claim 14, wherein the photosensitive layer contains pressure developable chemistry.

28. A method of placing a plurality of two-dimensional barcode symbols on a photographic element, the barcode symbols having a critical feature used for locating, timing and/or symbol orientation and comprising collections of modules arranged in a regular array with a plurality of defined orientation directions, the photographic element exhibiting linear defects in a predominant direction and having a maximum width, comprising the step of:
   a) offsetting the barcode symbols so that the critical features are offset by at least one module relative to each other in a direction perpendicular to the predominant direction.

29. The method claimed in claim 28, wherein the symbols are offset by two or more modules.

30. A method of placing a plurality of two-dimensional barcode symbols on a photographic element, the barcode symbols containing critical data and comprising collections of modules arranged in a regular array with a plurality of defined orientation directions, the photographic element exhibiting linear defects in a predominant direction and having a maximum width, comprising the step of:
   a) duplicating the critical data in two or more barcode symbols.

31. The method claimed in claim 30, further comprising the step of:
   b) offsetting the two or more barcode symbols so that the critical data are offset by at least one module relative to each other in a direction perpendicular to the predominant direction.

32. The method claimed in claim 31, wherein the symbols are offset by two or more modules.

33. A photographic element, the photographic element exhibiting linear defects having a maximum width and aligned in a predominant direction, comprising:
   a) a base;
   b) a photosensitive layer on the base; and
   c) a latent image of a plurality of two-dimensional barcode symbols in the photosensitive layer, the barcode symbols having a critical feature used for locating, timing and/or symbol orientation and comprising collections of modules arranged in a regular array with a plurality of defined orientation directions, the barcode symbols being offset from one another so that the critical features are offset by at least one module relative to each other in a direction perpendicular to the predominant direction.

34. The photographic element claimed in claim 33, wherein the symbols are offset by two or more modules.

35. A photographic element, the photographic element exhibiting linear defects having a maximum width and aligned in a predominant direction, comprising:
   a) a base;
   b) a photosensitive layer on the base; and
   c) a latent image of a plurality of two-dimensional barcode symbols in the photosensitive layer, the barcode symbols containing critical data and comprising collections of modules arranged in a regular array with a plurality of defined orientation directions, and the critical data being duplicated in two or more barcode symbols.

36. The photographic element claimed in claim 35, wherein two or more barcode symbols are offset so that the duplicated critical data are offset by at least one module relative to each other in a direction perpendicular to the predominant direction.

37. The photographic element claimed in claim 36, wherein the symbols are offset by two or more modules.

* * * * *